(12) United States Patent
Burov et al.

(10) Patent No.: US 6,211,605 B1
(45) Date of Patent: *Apr. 3, 2001

(54) PIEZOELECTRIC STEP MOTOR

(75) Inventors: Sergey Vyacheslavovich Burov, Arkhangelsk; Jury Vladimirovich Okatov, Severodvinsk, both of (RU)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/000,376

(22) PCT Filed: Jun. 5, 1997

(86) PCT No.: PCT/RU97/00175

§ 371 Date: Feb. 4, 1998

§ 102(e) Date: Feb. 4, 1998

(87) PCT Pub. No.: WO97/47072

PCT Pub. Date: Dec. 11, 1997

(30) Foreign Application Priority Data

Jun. 5, 1996 (RU) .................................... 96111313

(51) Int. Cl.[7] .................................................. H01L 41/08
(52) U.S. Cl. ........................................ 310/328; 310/323.02
(58) Field of Search .................................. 310/323, 328, 310/323.02

(56) References Cited

U.S. PATENT DOCUMENTS

| 5,043,621 | * | 8/1991 | Culp | 310/316 |
| 5,068,566 | * | 11/1991 | Culp | 310/328 |
| 5,136,201 | * | 8/1992 | Culp | 310/328 |
| 5,144,187 | * | 9/1992 | Culp | 310/328 |
| 5,182,484 | * | 1/1993 | Culp | 310/328 |
| 5,241,235 | * | 8/1993 | Culp | 310/328 |
| 5,273,238 | * | 12/1993 | Sato | 244/105 |

FOREIGN PATENT DOCUMENTS

| 0112454 | * | 10/1983 | (EP) . |
| 0360975 | * | 4/1990 | (EP) . |
| 60-002081 | * | 8/1985 | (JP) . |
| 60-082072 | * | 10/1985 | (JP) . |
| 573828 | * | 10/1977 | (SU) . |
| 738016 | * | 5/1980 | (SU) . |

* cited by examiner

Primary Examiner—Elvin Enad
Assistant Examiner—Peter Medley
(74) Attorney, Agent, or Firm—Piper Marbury Rudnick & Wolfe

(57) ABSTRACT

A piezoelectric stepping motor comprises a cylindrical housing (1), fixing units and a movable part (4). The fixing units comprise at least two rotary-shifting-fixing piezoelectric units (2,3) which are arranged one behind the other in a longitudinal plane. Each piezoelectric unit (2,3) comprises a rotary piezoelectric cell (5), a shifting piezoelectric cell (6), a fixing piezoelectric cell (7) and a friction element (9) separated by insulators (8).

6 Claims, 3 Drawing Sheets

PIEZOELECTRIC STEP MOTOR

FIELD OF THE INVENTION

The present invention relates to the field of electric motors and, more specifically, it relates to piezoelectric stepping motors.

BACKGROUND OF THE INVENTION

Known in the art is a piezoelectric motor which stator comprises a piezoelectric hollow cylinder accommodating a cylindrical rotor, frictionally interacting with the stator (SU, A, 573828).

However, this motor cannot effect a linear displacement of the cylindrical rotor.

Also known in the art is a piezoelectric linear stepping motor comprising a housing having fixing units secured in it and a movable part with a working member (SU, A, 720576).

However, this piezoelectric motor has a complicated design, performs only a linear displacement of the movable part and cannot provide rotation of the movable part.

SUMMARY OF THE INVENTION

The basic object of the present invention is to create a piezoelectric stepping motor which constructive embodiment would make it possible to simplify the design and manufacturing technology, to increase motor forces and the accuracy of positioning the movable part during its rotation, linear displacement and combined motion (simultaneous rotation and linear displacement).

This object is achieved by providing a piezoelectric stepping motor comprising a housing having fixing units secured therein and a movable part, in which motor, according to the invention, the fixing units comprise at least two rotary-shifting-fixing piezoelectric units arranged inside the housing in a longitudinal plane one behind the other, each piezoelectric unit comprising a rotary piezoelectric cell, a fixing piezoelectric cell and a friction element separated by insulators, or the fixing units comprise at least two pairs of rotary-shifting-fixing piezoelectric units which are arranged at least in one transverse plane and shaped in the form of sectors.

The housing may be movable, and the piezoelectric units may be secured on the stationary rotor.

The piezoelectric cells may be made in the form of a set of piezoelectric rings or their sectors which electrodes are connected in parallel alternately, in which case the direction of polarization of each successive piezoelectric ring or sector is opposite to that of the previous one.

The gaps between the piezoelectric units are preferably filled with an elastic insulating material.

Such constructive embodiment of the claimed stepping motor makes it possible to increase the forces developed by the motor and the accuracy in positioning the movable part.

BRIEF DESCRIPTION OF THE DRAWINGS

The invention is further described by way of example with reference to the accompanying drawings, in which.

THE BEST EMBODIMENTS OF THE INVENTION

Figure 1:
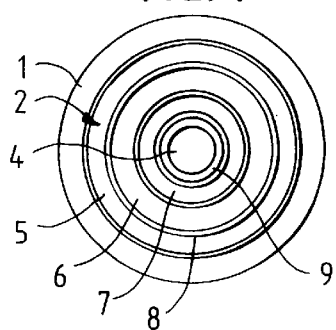
FIG. 1 is a front view of the claimed piezoelectric stepping motor (first embodiment)
Figure 2:
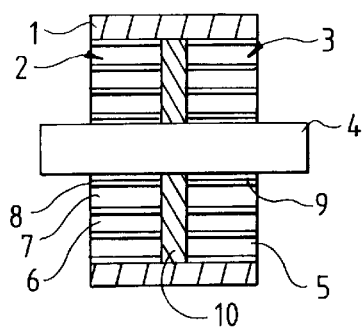
FIG. 2 is a longitudinal section of the motor shown in FIG. 1.

The claimed piezoelectric stepping motor according to the first embodiment of the invention comprises a cylindrical housing 1 ( FIG. 1), fixing devices in the form of two piezoelectric units 2 ( FIG. 2) and 3, and a movable part 4 made in the form of a cylindrical rod. The piezoelectric units 2 and 3 are rotary-shifting-fixing units. Each piezoelectric unit 2 and 3 consists of interconnected (for example, glued) elements: a rotary piezoelectric cell 5, a shifting piezoelectric cell 6, a fixing piezoelectric cell 7, insulators 8 and a friction element 9.

The rotary piezoelectric cell 5 performs the rotation of the movable part 4 about its axis and the vector of its initial polarization extends at an angle to the longitudinal axis of the motor.

The shifting piezoelectric cell 6 has a vector of its initial polarization directed at an angle to the longitudinal axis of the motor, and performs the displacement of the movable part 4 along the longitudinal axis of the motor.

The fixing piezoelectric unit 7 provides the fixation of the movable part 4, and the vector of its initial polarization is directed (radially) perpendicularly to the longitudinal axis of the motor.

The friction elements 9 are made in the form of a split ring providing tight clamping of the movable part 4 by the fixing piezoelectric cells of the piezoelectric units 2 and 3.

Each piezoelectric cell has electrodes connected to wires (not shown in the drawing).

The gaps between the piezoelectric units 2 and 3 are filled with an elastic insulating material 10.

Other embodiments of the piezoelectric stepping motor are possible.

Figure 3:
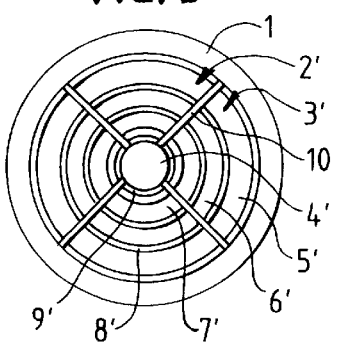
FIG. 3 is a front view of the second embodiment of the motor.
Figure 4:
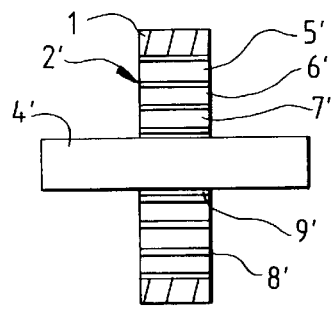
FIG. 4 is a longitudinal section of the motor shown in FIG. 3.

In the second embodiment of the motor shown in FIGS. 3 and 4 , where characters 2'–9' represent parts analogous to those represented by characters 2–9, respectively, of the first embodiment, piezoelectric units 2' and 3' are disposed in one transverse plane and are made in the form of sectors.

Figure 5:
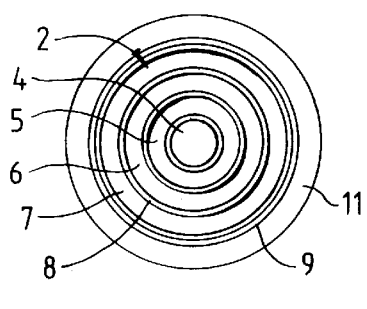
FIG. 5 is a front view of the third embodiment of the motor.
Figure 6:
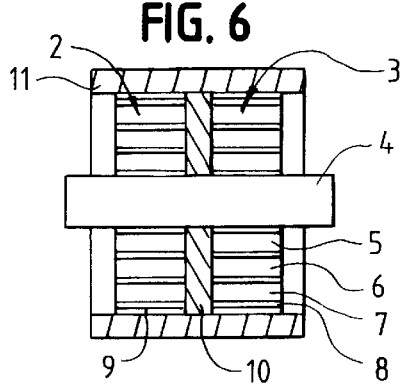
FIG. 6 is a longitudinal section of the motor shown in FIG. 5.

The third embodiment of the motor differs from the first one in that the movable part 4 ( FIGS. 5 and 6) is stationary while the cylindrical housing 11 is movable, the piezoelectric units 2 and 3 being secured on the cylindrical rod 4 (stationary rotor).

Figure 7:
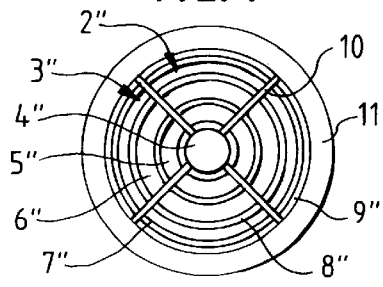
FIG. 7 is a front view of the fourth embodiment of the motor.
Figure 8:
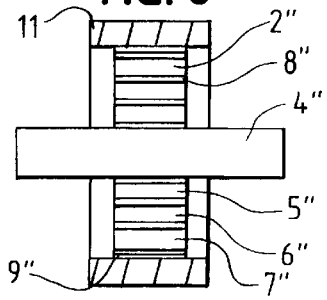
FIG. 8 is a longitudinal section of the motor shown in FIG. 7.
Figure 9:
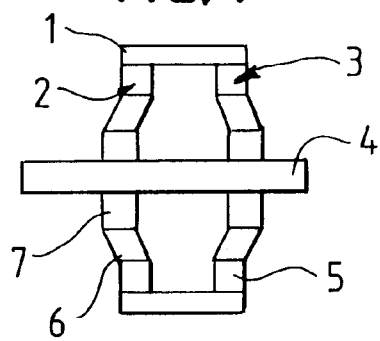
FIGS. 9–14 are the working time steps of the piezoelectric stepping motor with a linear displacement of the movable part, a longitudinal section.
Figure 10:
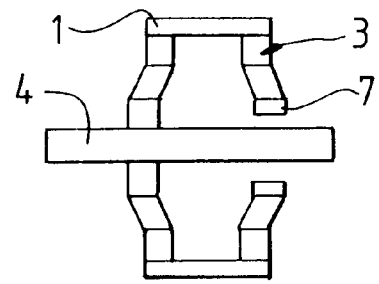
Figure 11:
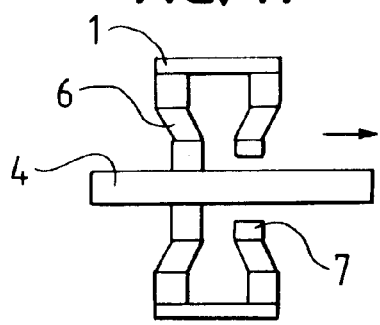
Figure 12:
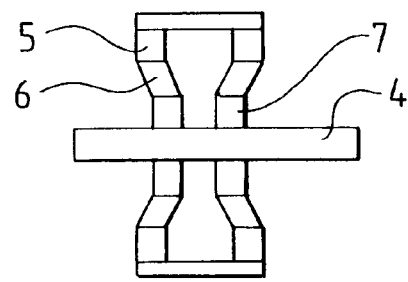
Figure 13:
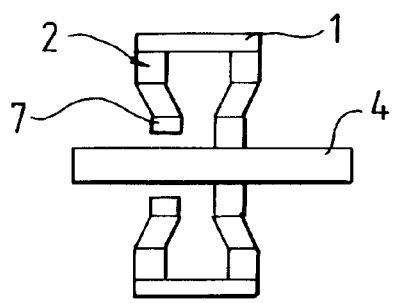
Figure 14:
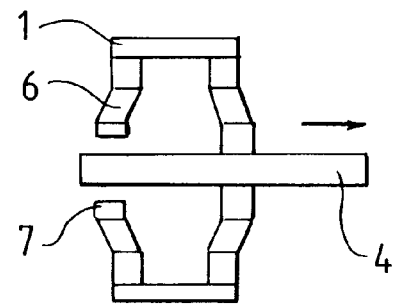

In the fourth embodiment, similar to the second embodiment, the movable part 4' ( FIGS. 7 and 8) is also stationary, while the cylindrical housing 11 can rotate and move along its axis, in which case the piezoelectric units 2' and 3' are disposed in one transverse plane and secured on the cylindrical rod.

The motor according to the invention operates as follows, using the first embodiment by example.

On applying a positive voltage to the electrodes of the rotary piezoelectric cell 5, the inverse piezoelectric effect results in a turn of the internal part of the ring through an angle $\alpha$ counterclockwise relative to the diametral line $A_1 A_2$, while application of a negative voltage results in a turn of the internal part through an angle $\alpha$ clockwise relative to the diametral line $A_1A_2$. When the positive voltage is applied to the electrodes of the shifting piezoelectric cells 6, the inverse piezoelectric effect results in a displacement of the internal part leftwards relative to the external part of the ring, while the application of the negative voltage results in a displacement of the internal part rightwards relative to the external part of the ring. When the positive voltage is applied to the electrodes of the fixing piezoelectric cell 7, the latter clamps the movable part 4 while in the case of applying the negative voltage thereon it is pushed apart from the movable part 4.

The piezoelectric stepping motor can perform various types of movements: linear displacement of the movable part; rotary motion; combined linear and rotary motion; various combinations of these movements.

The working cycle consists of six time steps.

The operation of the motor during the linear displacement of the movable part 4 is shown in FIGS. 9–14.

In this case, the shifting piezoelectric cells 6 of the piezoelectric units 2 and 3 and fixing piezoelectric cells 7 of the same units take part in the operation. The first time step corresponds to the positions of the piezoelectric cells 6 and 7 of the piezoelectric units 2 and 3 shown in FIG. 9. The positive voltage is applied to the piezoelectric cells 6 and 7 of the piezoelectric unit 2 and to the piezoelectric cell 7 of the piezoelectric unit 3, while the negative voltage is applied to the piezoelectric cell 6 cell of the piezoelectric unit 3, in which case the piezoelectric cell 6 of the piezoelectric unit 2 is displaced leftwards and the piezoelectric cell 6 of the piezoelectric unit 3 is displaced rightwards. The fixing piezoelectric cells 7 of the piezoelectric units 2 and 3 clamp the movable part 4. The rotary piezoelectric cells 5 take no part in the linear displacement and can occupy any position which does not change during the operation of the motor in the linear displacement mode.

In the second time step the negative voltage is applied to the fixing piezoelectric cell 7 ( FIG. 10) and it is pushed apart from the movable part 4.

In the third time step the negative voltage is applied to the shifting piezoelectric cell 6 ( FIG. 11) of the piezoelectric unit 2, and this cell moving rightwards displaces the fixing piezoelectric cell 7 and the movable parts 4 rightwards for one step. At the same time, the positive voltage is applied to the shifting piezoelectric cell 5 of the piezoelectric unit 3 and the latter is displaced leftwards together with the fixing piezoelectric cell 7.

In the fourth time step the positive voltage is applied to the fixing piezoelectric cell 7 (FIG. 12) of the piezoelectric unit 3 which clamps the movable part 4.

In the fifth time step the negative voltage is applied to the fixing piezoelectric cell 7 ( FIG. 13) of the piezoelectric unit 2 and the latter is pushed apart from the movable part 4.

In the sixth time step the piezoelectric units 2 and 3 separate, i.e. the positive voltage is applied to the electrodes of the shifting piezoelectric cell 6 ( FIG. 14) of the piezoelectric unit 2 and it moves leftwards, while the negative voltage is applied to shifting piezoelectric cell 6 of the piezoelectric unit 3 and the latter moves rightwards together with the fixing piezoelectric cell 7 and movable part 4. The movable part 4 is displaced for one more step. In so doing the working cycle is completed, the movable part is displaced for two steps.

Then the process of linear displacement is continued in the same sequence.

During the rotation of the movable part 4 the motor operation is effected as shown in FIGS. 15–20.

Figure 15:
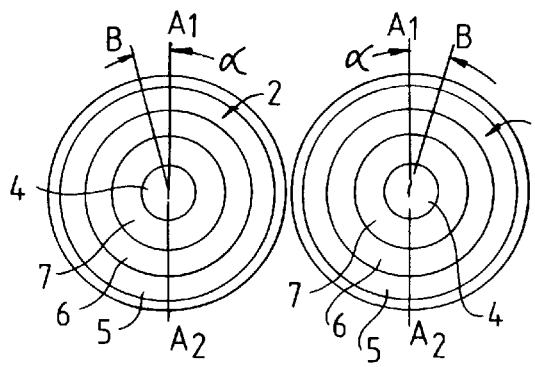
FIG. 15 is a cross-sectional view of two piezoelectric units during the rotation of the movable part of the motor.
Figure 16:
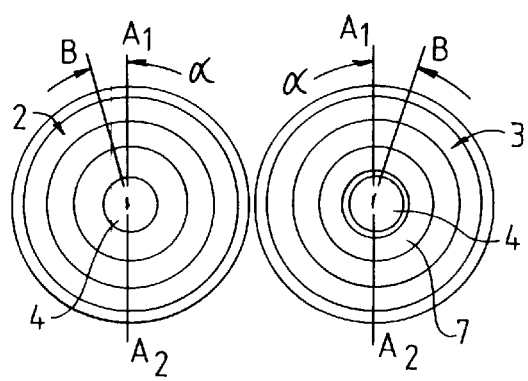
FIGS. 16–20 show the other working time steps of the piezoelectric stepping motor during the rotation of the movable part.
Figure 17:
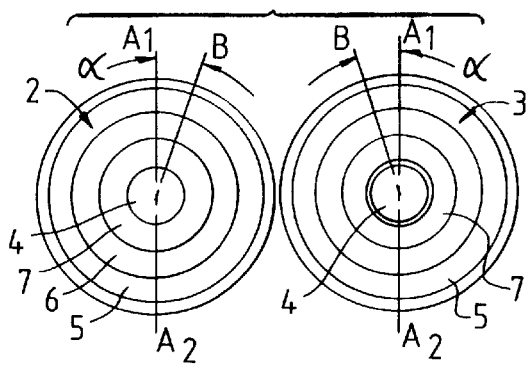
Figure 18:
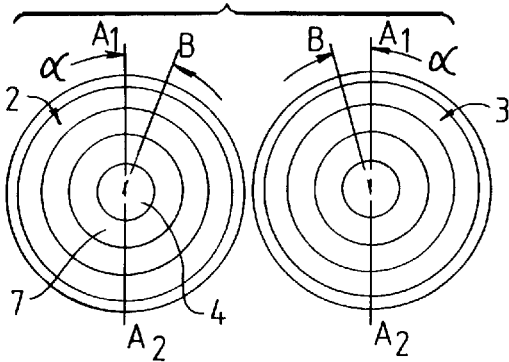
Figure 19:
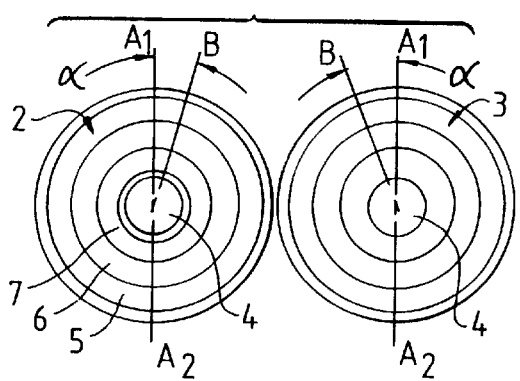
Figure 20:
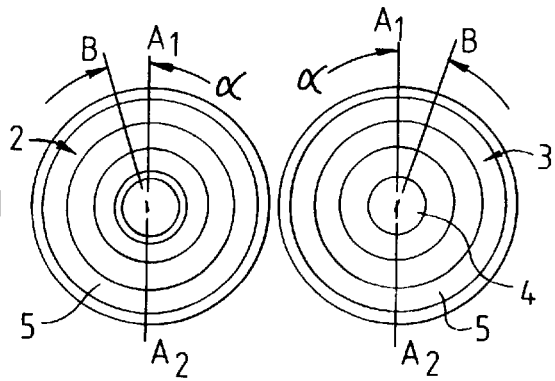

FIG. 15 shows the position corresponding to the first time step. The rotary piezoelectric cells 5 and fixing piezoelectric cells 7 of the piezoelectric units 2 and 3 take part in this operation. The piezoelectric cells 6 do not operate and can occupy any position that does not change in the process of operation. The positive voltage is applied to the piezoelectric cells 5 and 7 of the piezoelectric unit 2, in which case the rotary piezoelectric cell 5 displaces the fixing piezoelectric cell 7 for an angle $\alpha$ counterclockwise and the piezoelectric cell 7 clamps the movable part 4. The negative voltage is applied to the rotary piezoelectric cell 5 of the piezoelectric unit 3 and this piezoelectric cell displaces the fixing piezoelectric cell 7 for an angle $\alpha$ clockwise, while the fixing piezoelectric cell 7 clamps the movable part 4.

In the second time step the negative voltage is applied to the fixing piezoelectric cell 7 ( FIG. 16) of the piezoelectric unit 3 and this cell is pushed apart from the movable part 4.

In the third time step the negative voltage is applied to the rotary piezoelectric cell 5 ( FIG. 17) of the piezoelectric unit 2 which rotates both the fixing piezoelectric cell 7 and the movable part 4 through an angle $2\alpha$ clockwise. In so doing the positive voltage is applied to the rotary piezoelectric cell 5 of the piezoelectric unit 3 and the fixing piezoelectric cell 7 is turned through an angle $2\alpha$ counterclockwise.

In the fourth time step the positive voltage is applied to the fixing piezoelectric cell 7 ( FIG. 18) of the piezoelectric unit 2 and the latter clamps the movable part 4.

In the fifth time step the negative voltage is applied to the fixing piezoelectric cell 7 ( FIG. 19) of the piezoelectric unit 2 and it is pushed apart from the movable part 4.

In the sixth time step the positive voltage is applied to the rotary piezoelectric cell 5 ( FIG. 20) of the piezoelectric unit 2 which is turned through an angle $2\alpha$ counterclockwise. The negative voltage is applied to the rotary piezoelectric cell 5 of the piezoelectric unit 3 and this cell rotates the movable part 4 through an angle $2\alpha$ clockwise.

The movable part 4 is rotated through an angle $4\alpha$ per working cycle. Then cycles are repeated, in which case the movable part 4 rotates clockwise.

The reversing motion is performed by changing the polarity of the voltage to be applied to the fixing piezoelectric cells.

The claimed piezoelectric stepping motor has a simple design and manufacturing technology, small size and mass, a high force on the movable part, and makes it possible to combine the linear displacement and the rotation of the movable part.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

Industrial Applicability

The invention can be used as a slave mechanism in electrical engineering, telemechanics, radio engineering and automation.

What is claimed is:

1. A piezoelectric stepping motor comprising:
   a) a housing having an inner surface;
   b) at least two cylindrical, hollow rotary-shifting-fixing piezoelectric units attached to the inner surface of the housing, each of the rotary-shifting-fixing piezoelectric units being in separate transverse planes, each rotary-shifting-fixing piezoelectric unit having a cylindrical rotary piezoelectric cell, a cylindrical shifting piezoelectric cell, a cylindrical fixing piezoelectric cell, and a friction member attached to the fixing piezoelectric cell; and
   c) a shaft, which frictionally interacts with at least one friction member, the rotary and fixing piezoelectric cells of each rotary-shifting-fixing piezoelectric unit being configured to operate sequentially in order to rotate the shaft, the shifting and fixing cells of each rotary-shifting-fixing piezoelectric unit being configured to operate sequentially in order to move the shaft linearly.

2. A piezoelectric stepping motor, comprising:
   a) a housing having an inner surface;
   b) at least two coplanar sets of rotary-shifting-fixing piezoelectric sectors attached to the inner surface of the housing, each rotary-shifting-fixing piezoelectric sector having a rotary piezoelectric cell, a shifting piezoelectric cell, a fixing piezoelectric cell, and a friction member attached to the fixing piezoelectric cell; and
   c) a shaft, which frictionally interacts with at least one friction member, the rotary and fixing piezoelectric cells of each set of rotary-shifting-fixing piezoelectric sectors being configured to operate sequentially in order to rotate the shaft, the shifting and fixing piezoelectric cells of each set of rotary-shifting-fixing piezoelectric sectors being configured to operate sequentially in order to move the shaft linearly.

3. The motor of claim 2, wherein the fixing piezoelectric cells are disposed in the rotary-shifting-fixing piezoelectric sectors between the rotary piezoelectric cells and the shaft.

4. The motor of claim 3, further comprising an insulating material disposed between and separating the rotary-shifting-fixing piezoelectric sectors.

5. The motor of claim 3, wherein the rotary piezoelectric cells have an inner surface and a rotational vector of polarization such that the inner surfaces of the rotary piezoelectric cells shift angularly when voltage is applied to the rotary piezoelectric cells.

6. The motor of claim 2, wherein the shaft has at least one guide, and wherein at least one friction member has a guide configured to frictionally interact with one of the shaft guides.

* * * * *